Sheet 1 – 2 Sheets.
W. T. Chaffee.
Grain-Separator.
N° 75520      Patented Mar. 17, 1868.
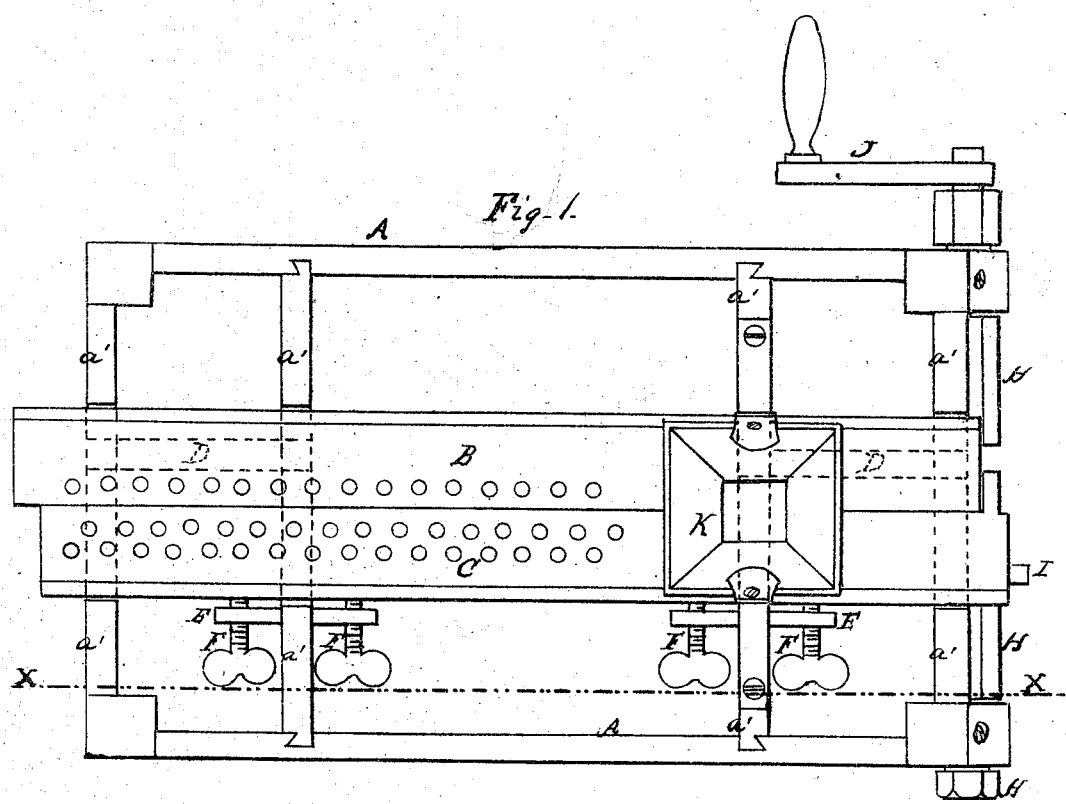
Witnesses
W. C. Ashkettle
Alex F. Roberts.
Inventor
W. T. Chaffee
per Munn & Co.
Attorneys Sheet 2 — 2 Sheets.
W. T. Chaffee.
Grain-Separator.
No. 75520. Patented Mar. 17, 1868.
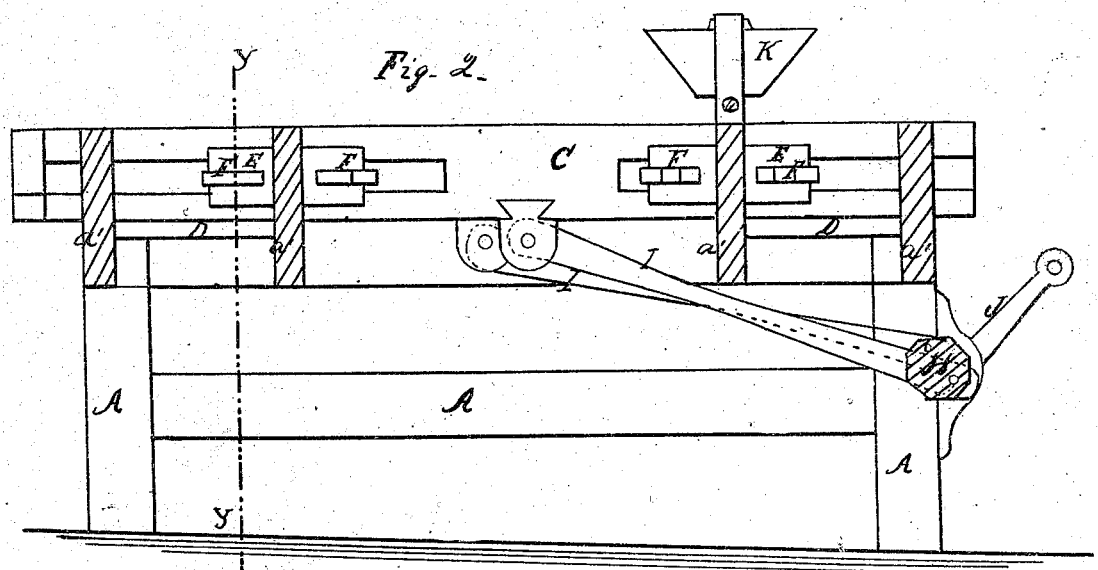
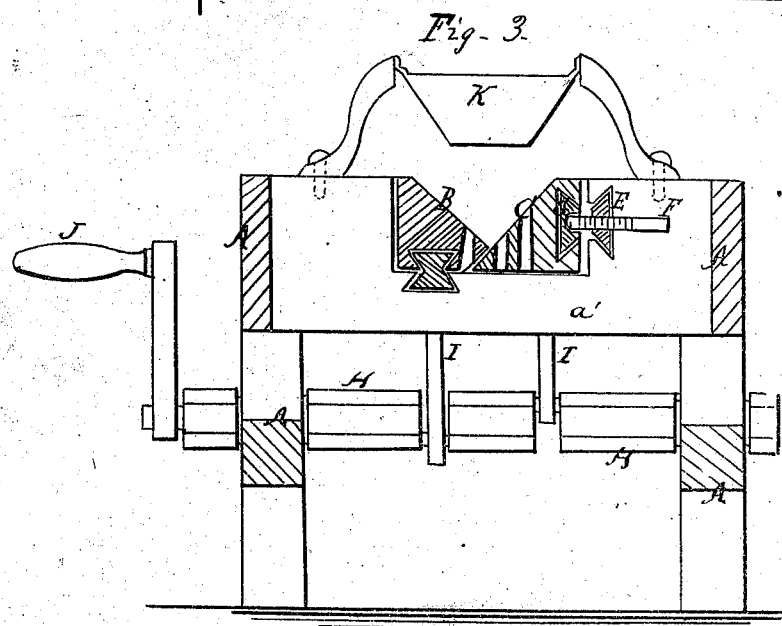
Witnesses
W. C. Ashkettle
Alex. F. Roberts
Inventor
W. T. Chaffee
per Munn & Co
attorneys

United States Patent Office.

W. T. CHAFFEE, OF RICHMOND, VIRGINIA, ASSIGNOR TO HIMSELF AND SAMUEL M. DRINKER, OF SAME PLACE.

Letters Patent No. 75,520, dated March 17, 1868.

IMPROVEMENT IN GRAIN-SEPARATOR.

The Schedule referred to in these Letters Patent and making part of the same.

TO ALL WHOM IT MAY CONCERN:

Be it known that I, W. T. CHAFFEE, of Richmond, in the county of Henrico, and State of Virginia, have invented a new and useful Improvement in Cockle and Grain-Separator; and I do hereby declare that the following is a full, clear, and exact description thereof, which will enable those skilled in the art to make and use the same, reference being had to the accompanying drawings, forming part of this specification.

Figure 1 is a top or plan view of my improved machine.

Figure 2 is a vertical longitudinal section of the same, taken through the line $x\,x$, fig. 1.

Figure 3 is a vertical cross-section of the same, taken through the line $y\,y$, fig. 2.

Similar letters of reference indicate corresponding parts.

My invention has for its object to furnish an improved machine, designed especially for separating wheat and other grain from cockle, partridge-pea or berry, and other small seeds, and for separating the large, full kernels of grain for seed from the smaller kernels, which shall be simple in construction, easily operated, and effective in operation; and it consists in the construction and combination of the various parts, as hereinafter more fully described.

A is the frame of the machine, the front end of which, where the grain is introduced, should be made higher than the rear end, at which the grain is discharged. B and C are two long triangular bars, placed and working in notches formed in the cross-bars $a'$ of the frame A, and which should exceed in length the length of the frame A. The bars B and C should be so placed that their inclined sides may be towards each other, and may form a spout or trough, along which the grain passes while being cleaned. The bars B and C have tapering vertical holes formed in them, as shown in figs. 1 and 3; the small ends of said tapering holes being upward, so that the small seeds in passing through may not clog the said holes. D are guides, dove-tailed to the cross-bars $a'$ of the frame A, which enter a dove-tailed groove or grooves formed in the lower side or base of one of the triangular bars, as B, to guide it and hold it in its proper relative position while being operated. E are bars, dove-tailed or otherwise secured to the vertical sides of the notches in the cross-bars $a'$ of the frame A, and which are connected by hand-screws, F, with dove-tailed bars, G, which enter a dove-tailed groove or grooves in the sides of the other triangular bar, as C, as shown in figs. 2 and 3, so as not only to guide the said bar and hold it in its proper relative position while being operated, but also to enable the said bar C to be moved back laterally, so that the small kernels of grain may escape between the bars B and C, allowing only the larger or well-filled kernels to pass out at the end of the trough formed by the said bars. The bars B and C may be moved longitudinally back and forth alternately to facilitate the movement of the grain by cranks or eccentric, formed upon or attached to the shaft H, and connected to the lower sides of the bars B and C by the pitmen I, as shown in fig. 2. The shaft H revolves in bearings in the forward end of the frame A, and motion may be given to it by a crank, J, or by a pulley, as may be desired. K is the hopper, through which the grain is introduced into the machine, and which is attached to the frame A in such a position as to be above the higher or forward end of the spout or trough formed by the triangular perforated bars B and C. If desired, an apron or spout may be placed beneath the trough B C to receive the cockle, &c., and guide it to the forward end of the machine, while the cleaned grain escapes from the rear or tail-end of the machine.

I claim as new, and desire to secure by Letters Patent—

1. The combination of the perforated, sliding, triangular bars B and C with each other and with the frame A, substantially as herein shown and described, and for the purpose set forth.

2. Connecting one of the triangular bars, as C, to the cross-bars $a'$ of the frame A by the dove-tailed bars E and G and hand-screws F, or by equivalent means, so that it may be moved back and forth or adjusted laterally, substantially as herein shown and described, and for the purpose set forth.

3. The combination of the crank-shaft H and pitmen I with the sliding triangular bars B and C, and with the frame A, substantially as herein shown and described, and for the purpose set forth.

The above specification of my invention signed by me, this 11th day of January, 1868.

W. T. CHAFFEE.

Witnesses:
ANDREW L. ELLETT,
J. S. BURKE.